Oct. 22, 1940.  A. M. ROSSMAN  2,218,554
ELECTRIC SWITCHGEAR
Filed Aug. 24, 1936  6 Sheets-Sheet 1

Inventor
Allen M. Rossman
by Morris Spector
Attorney

Oct. 22, 1940.  A. M. ROSSMAN  2,218,554
ELECTRIC SWITCHGEAR
Filed Aug. 24, 1936  6 Sheets-Sheet 2

Inventor
Allen M. Rossman
by Morris Spector
Attorney

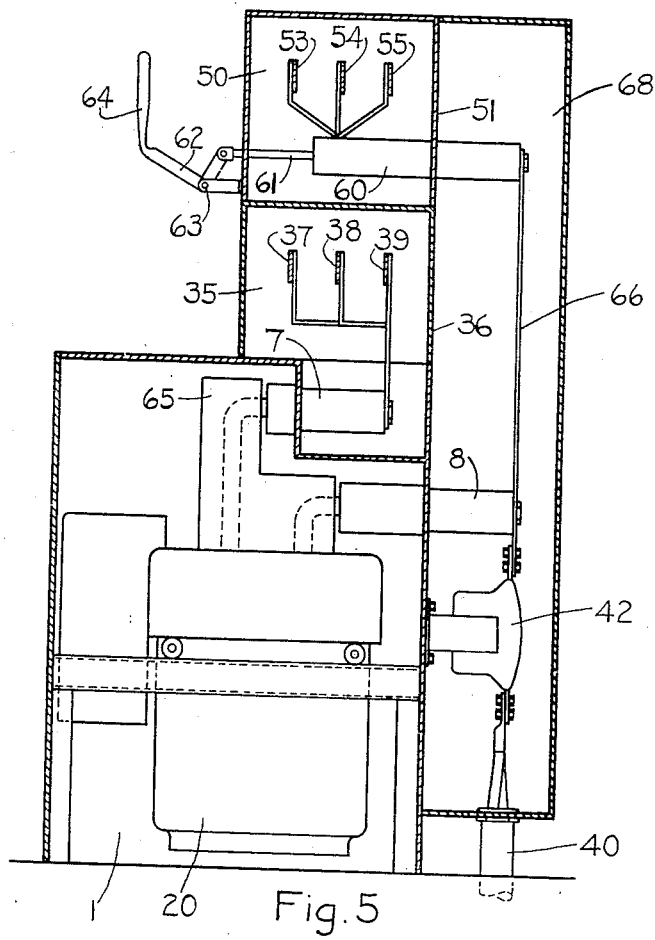

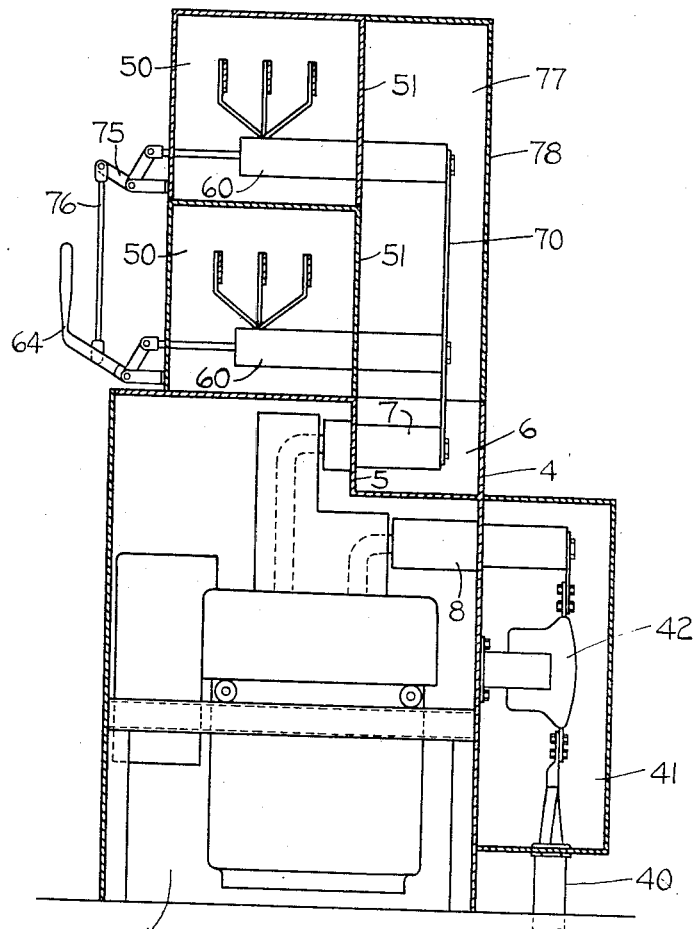

Oct. 22, 1940.  A. M. ROSSMAN  2,218,554
ELECTRIC SWITCHGEAR
Filed Aug. 24, 1936    6 Sheets-Sheet 5
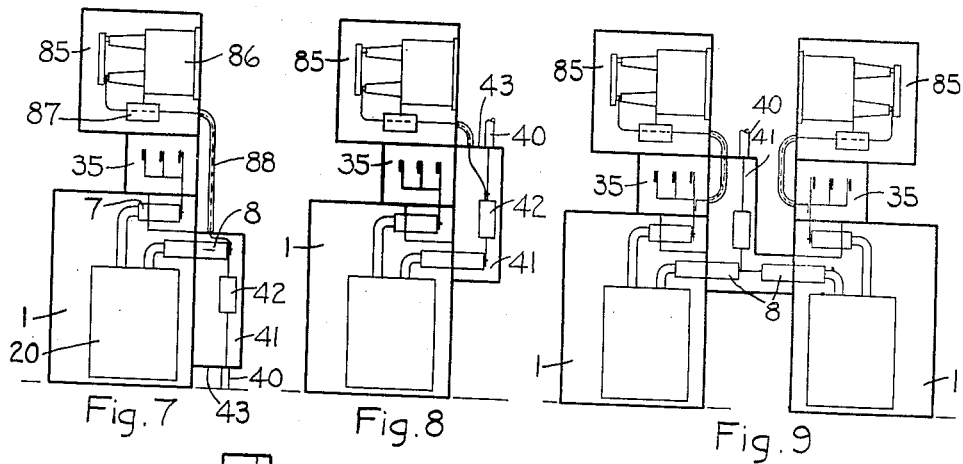
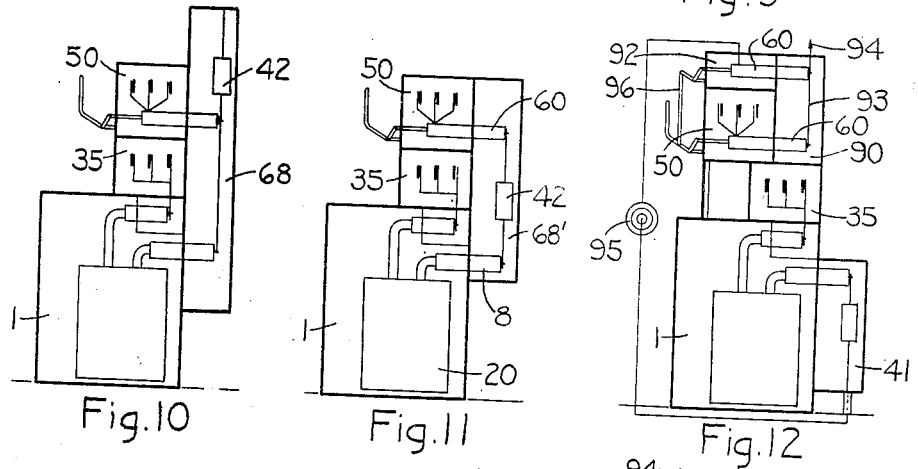
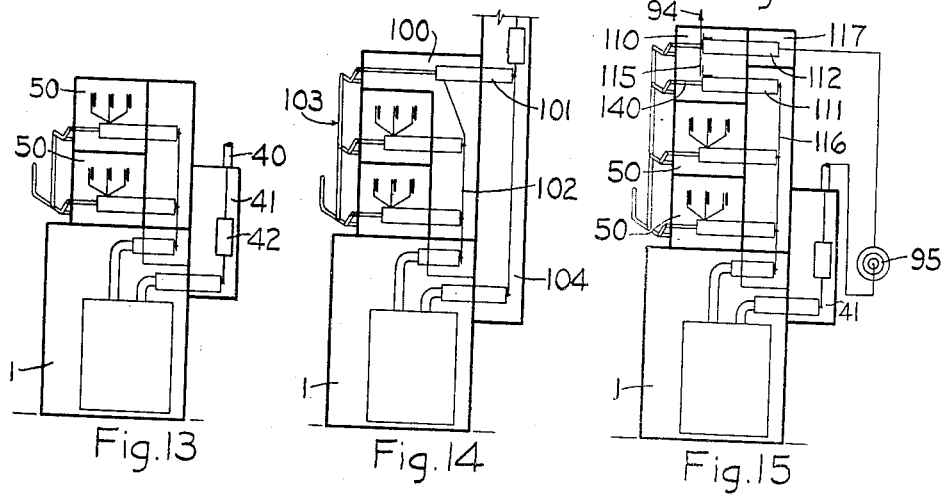
Inventor
Allen M. Rossman
by Morris Spector
Attorney Oct. 22, 1940.　　　　A. M. ROSSMAN　　　　2,218,554
ELECTRIC SWITCHGEAR
Filed Aug. 24, 1936　　　　6 Sheets-Sheet 6
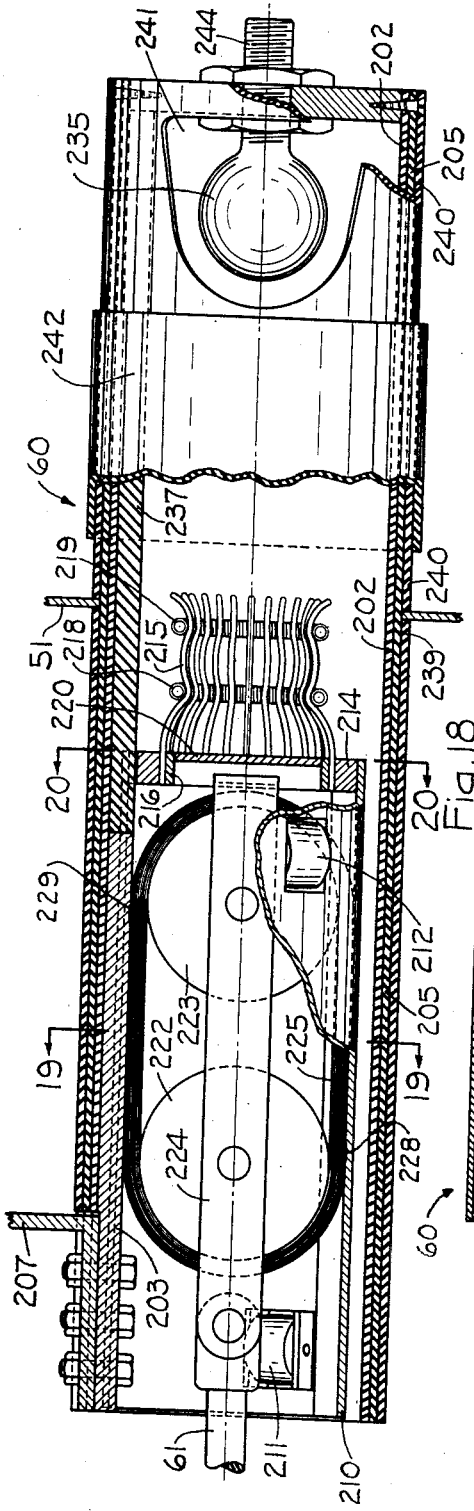
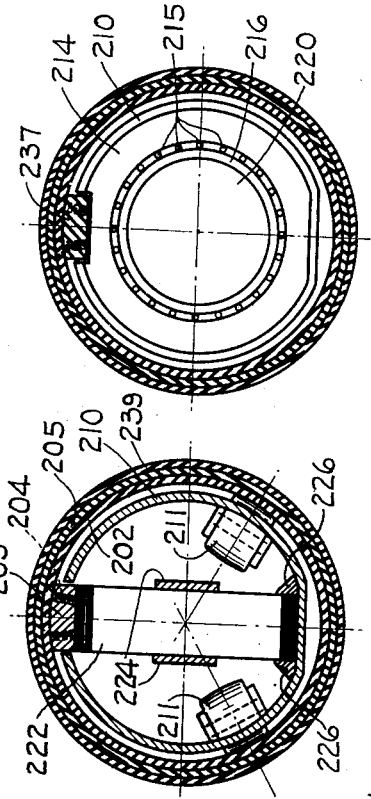
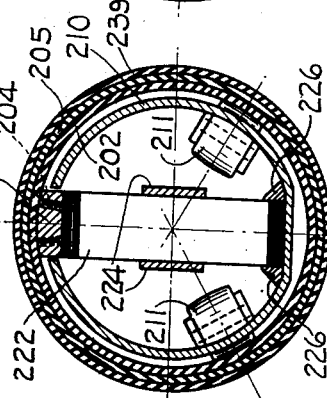
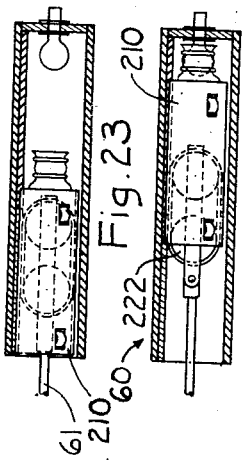
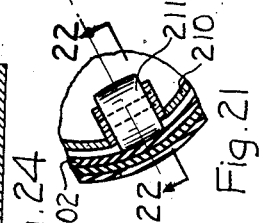
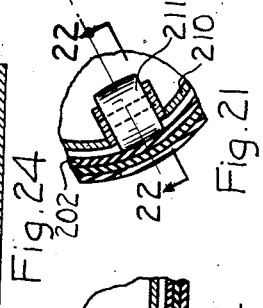
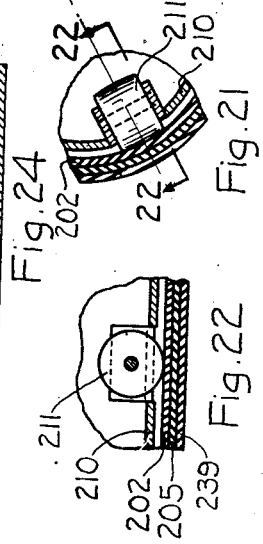
Inventor
Allen M. Rossman
by Morris Spector
Attorney Patented Oct. 22, 1940

2,218,554

UNITED STATES PATENT OFFICE 2,218,554

ELECTRIC SWITCHGEAR

Allen M. Rossman, Wilmette, Ill.

Application August 24, 1936, Serial No. 97,541

36 Claims. (Cl. 175—298)

This invention relates to electric switchgear, and more particularly to metal-clad switchgear for use on medium voltages and medium current systems.

It is one of the objects of the present invention to provide a series of metal-clad switchgear units, each unit being so constructed and arranged that it may be fitted together with selected ones of the other units to form any of a number of standardized switching systems. One of the units comprises a circuit breaker compartment adapted to house a removable circuit breaker, and containing circuit breaker disconnect switching contacts which are engaged by contact-making members on the circuit breaker when the same is moved to its operative position. The circuit breaker compartment is so arranged that it can support a standardized bus compartment, the construction of the two compartments being so correlated that a current transformer compartment can be mounted on the circuit breaker compartment for establishing line connections to one of the circuit breaker disconnect contacts, with the incoming line or circuit extending to the unit either from above or below.

Another standardized unit that is provided by the present invention consists of a second bus compartment with disconnect switches for selectively establishing and dis-establishing connections with the busses therein. The second bus compartment is so constructed that it can be mounted directly upon the first bus compartment without interference with the mounting of the current transformer compartment in either the upwardly line receiving position or the downwardly line receiving position.

By means of these four standard units, together with a fifth unit which is arranged to house the end of the bus disconnect switches, it is possible to build up any one of a plurality of desired mechanical structures which will give practically any of the standard circuit connections.

The circuit breaker is, preferably, of the three-phase type. Bushings are mounted on top of the circuit breaker head and carry the connections from within the circuit breaker to horizontally projecting circuit breaker disconnect contacts. The stationary disconnect contacts that are to be engaged by the circuit breaker disconnect contacts are mounted in the rear wall of the circuit breaker compartment and extend horizontally, so that engagement between the corresponding contacts is made by a horizontal movement of the circuit breaker. The contacts carried by the circuit breaker compartment are arranged in two rows, one above the other, with the upper row placed forward of the lower row to form a pocket for the establishment of electrical connections to the upper row of contacts without interference with the compartment that is connected to the lower row of contacts.

It is a still further object of this invention to provide an improved horizontally movable disconnect switch which is simple and compact in construction and wherein there is a minimum of sliding contact between current-carrying parts and loose flexible conductors for bridging joints are eliminated.

The attainment of the above and further objects of the present invention will be apparent from the following specification taken in conjunction with the accompanying drawings forming a part thereof.

In the drawings:

Fig. 5 is a cross sectional view of another switchgear, having main and transfer busses;

Fig. 6 is a cross sectional view through still another unit wherein the main and transfer busses may be connected in a different manner;

Figures 1, 4:
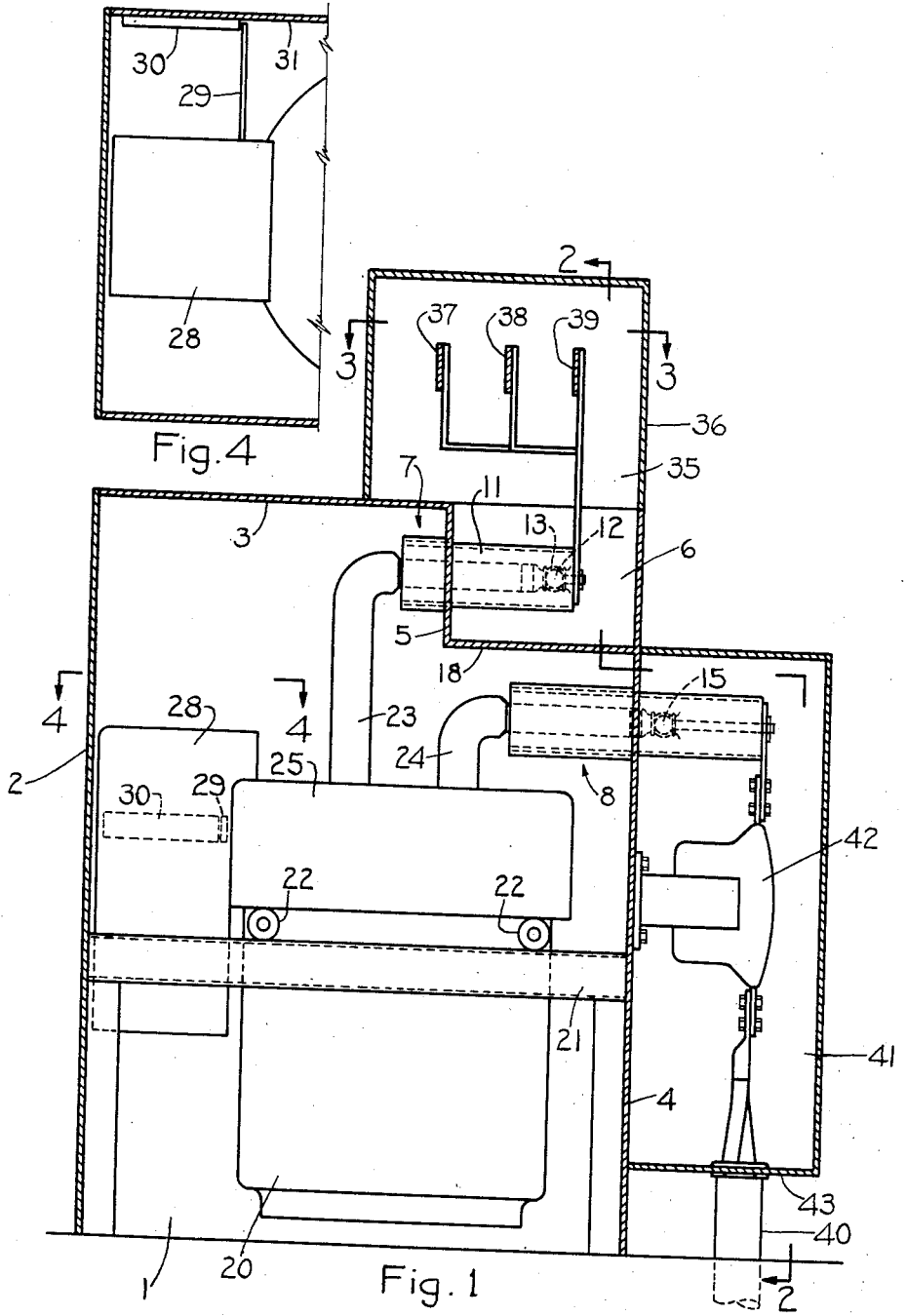
Fig. 1 is a cross sectional view of a switchgear, the circuit breaker being shown in elevation.
Fig. 4 is a fragmentary sectional view taken along the line 4—4 of Fig. 1.
Figure 3:
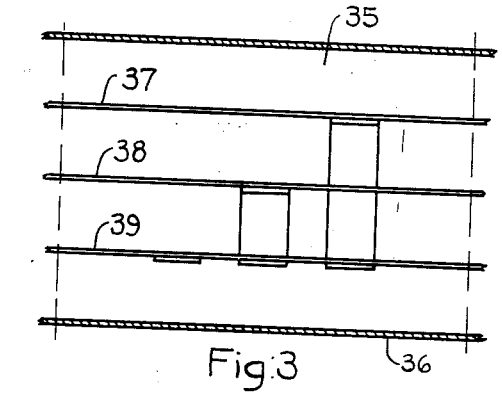
Fig. 3 is a sectional view taken along the line 3—3 of Fig. 1.
Figure 2:
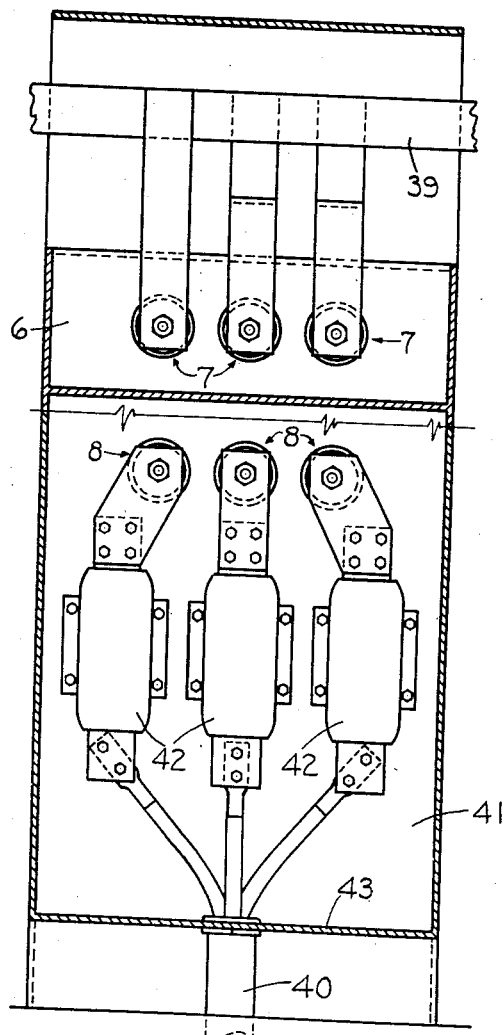
Fig. 2 is a sectional view taken along the line 2—2 of Fig. 1.
Figure 16:
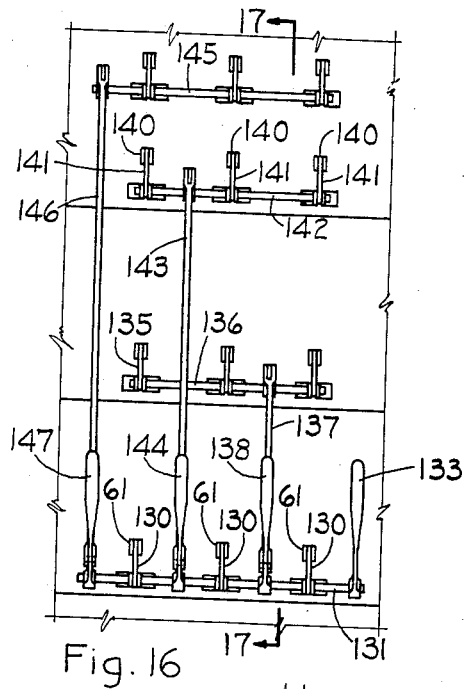
Figure 17:
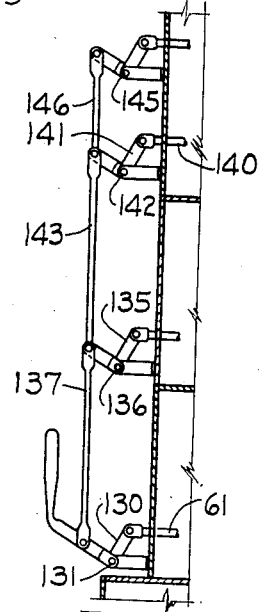

Figs. 7 through 15 inclusive, are diagrammatic views illustrating how a series of standardized units may be built up to form different types of switchgear, in which Fig. 7 shows an arrangement such as is illustrated more fully in Fig. 1, with a potential transformer mounted on the main bus compartment;

Fig. 8 shows a system similar to Fig. 7 and illustrates the reverse mounting of the current transformer compartment to receive an overhead line instead of an underground line;

Fig. 9 illustrates a switchgear comprising two back-to-back units such as shown in Fig. 7;

Fig. 10 illustrates a switching unit like that of Fig. 5, and shows how connections can be made from an overhead line, as well as from an underground line;

Fig. 11 is a diagrammatic view of a bus-tie switchgear for interconnecting a main and a transfer bus through the circuit breaker;

Fig. 12 illustrates a switching unit wherein the main and the transfer bus may be interconnected through a circuit breaker and a regulator, and wherein the outgoing line can be fed from the main bus through the circuit breaker and the regulator, or from the transfer bus independently of the circuit breaker and regulator;

Fig. 13 illustrates a system wherein an incoming line can be fed through a circuit breaker connected selectively to either or both of two busses, through suitable disconnect switches;

Fig. 14 illustrates a system wherein a line can be fed from a main bus or a bus through a circuit breaker, or independently of the circuit breaker;

Fig. 15 illustrates a system wherein a line can be fed selectively from either or both of two busses independently of a circuit breaker, or from either or both of those busses through a circuit breaker and a regulator;

Fig. 16 is a front view of a link and crank arrangement for simultaneously operating the disconnect switches in each of a plurality of banks, in this instance four, arranged as in Fig. 15;

Fig. 17 is a sectional view of the link-work of Fig. 16 taken on the line 17—17 of Fig. 16;

Fig. 18 is a longitudinal sectional view of a horizontally movable disconnect switch, with certain of the parts broken away to illustrate the interior of the switch;

Fig. 19 is a sectional view taken along the line 19—19 of Fig. 18;

Fig. 20 is a sectional view taken along the line 20—20 of Fig. 18;

Fig. 21 is a fragmentary sectional view through one of the supporting wheels for the carriage of the disconnect switch;

Fig. 22 is a fragmentary view taken along the line 22—22 of Fig. 21;

Fig. 23 is a diagrammatic view of the switch in its open position, and

Fig. 24 is a diagrammatic view illustrating the disconnect switch in its closed position.

Reference may now be had more particularly to the switchgear shown in Fig. 1. The switchgear comprises a circuit breaker compartment 1 formed, preferably, of sheet metal, and having a removable front wall or panel 2, a top closure 3, and a rear wall 4 which, on the interior of the compartment, is stepped forward adjacent the top thereof, as indicated at 5, to provide a pocket 6 along the top rear edge of the compartment. The portion 5 of the back wall is a partition in front of the wall 4. The stationary parts of two sets of disconnect switches 7 and 8 are mounted in the rear wall of the compartment. Each switch 7 includes a tube or bushing 11 of insulating material which is open at its front end and extends through a hole in the rear wall portion 5. The bushing has a male contact member 12 mounted at the rear thereof and adapted to be engaged by a female contact 13 carried by a bushing on the circuit breaker in a manner to be more fully explained as this description proceeds. As previously stated, the tube 11 is open at the front so that the female contact may move horizontally into the tube and engage the male contact 12. Each disconnect switch 8 is of a construction similar to the switches 7 except that the stationary male contact 15 is further from the rear end of the tube than is the contact 12. The front of the tube 11 of each of the switches 7 may be metal-clad, or, if desired, in the case of a system using three-phase circuit breakers, the front of all three tubes 11 (which are in horizontal alignment) may be surrounded by one metal casing, open at the front to permit the entry of the contact-making members. The same is true of the tubes of the switches 8. The rear wall portion 5 and the horizontal top portion 18 of the circuit breaker compartment constitute a ground interposed between the two sets of disconnect switches 7 and 8.

The circuit breaker within the compartment is indicated at 20. It is, preferably, a three-phase circuit breaker. The head 25 of the circuit breaker rests on rails 21 on opposite sides of the compartment through rollers 22—22, thereby permitting horizontal movement of the breaker within the compartment. Bushings 23 and 24, of which there are three of each, extend upwardly from the circuit breaker head and carry female disconnect switch contact-making members at their upper ends, said contact-making members extending from the bushings in a horizontal direction so that when the circuit breaker is moved horizontally into the compartment, the contact-making members enter the tubes of the respective switches 7 and 8. By moving the circuit breaker on its own wheels in a horizontal direction, the breaker can be disconnected from the stationary contacts. This operation can be performed by one man in a few seconds. The circuit breaker may then be inspected, or repaired, with safety. While it would be feasible to provide sufficient space under the circuit breaker to permit the tank to be dropped while the circuit breaker is in the compartment, it is proposed that for inspection of the circuit breaker contacts, the breaker be removed from its compartment. The six bushings on each circuit breaker can be individually metal-clad, or, all six can be housed in a single metal enclosure with the contacting end of each terminal projecting outside of the enclosure. The individual metal-clad arrangement is shown in Fig. 1, the single metal enclosure in Fig. 5. The two are interchangeable.

The circuit breaker carries an operating mechanism 28 which may be of any preferred construction. A vertically swinging tripping latch 29 projects from the operating mechanism. When the circuit breaker is closed, the latch 29 is in horizontal alignment with a stop lug 30 which is welded or otherwise secured to one side wall 31 of the compartment. Therefore the circuit breaker cannot be removed until the tripping latch 19 is moved to its tripping position out of the way of the stop lug 30. Likewise the circuit breaker cannot be moved into the compartment when it is in its "switch closed" position, because the latch 29 will abut against the forward end of the stop lug 30. There is thus provided an interlock which prevents insertion or removal of the circuit breaker from the compartment when the circuit breaker is in its "closed" position. This is necessary because the horizontal movement of the circuit breaker into or out of a compartment serves to connect or disconnect the circuit breaker with the contacts 12 and 15, which are connected, respectively, to the busses and the outgoing line.

A sheet metal bus compartment 35 is mounted on top of the circuit breaker compartment 1, in this instance, directly over the pocket 6. The rear wall 36 of the bus compartment is flush with the rear wall 4 of the circuit breaker compartment. Busses 37, 38 and 39, one for each phase, extend longitudinally through the bus compartment and are connected to the respective contacts 12 of the respective upper disconnect switches 7. An incoming or outgoing line or circuit 40 extends into a sheet metal current transformer compartment 41 in which are mounted current transformers 42, which are connected in the line circuit for metering or control purposes. The three conductors of the line 40 are connected to the respective contacts 15 of the disconnect switches 8.

The wall 4 of the circuit breaker compartment and the wall 36 of the bus bar compartment are flush with one another. It is therefore apparent that the current transformer compartment 41 may be mounted with its line-receiving end 43 downward, as illustrated in Fig. 1, or extending upwardly, as illustrated in Fig. 8. This is necessary when the incoming line or circuit extends to the switchgear from an upward direction. The vertical distance from the center of the contact 15 to the bottom of the current transformer compartment 41 is preferably the same as the distance from the center of this contact to the top of the bus bar compartment 35. When the current transformer compartment is used on a system wherein the incoming conductors extend to the switchgear from overhead, the compartment 41 is mounted in a position rotated 180° about the axis of the switch 8, thus bringing the lower surface 43 flush with the top surface of the bus bar compartment 35. It is thus possible, by this construction, to take the leads away from the current transformer compartment vertically, and, optionally, in either the upward or downward direction, while using the same standard current transformer compartment construction.

By using the horizontal disconnecting construction, whereby the connections to the circuit breaker are obtained by horizontal movement of the breaker itself, I eliminate the usual circuit breaker elevating mechanism, and reduce the overall height of the unit, as compared with corresponding structures wherein the breaker is moved vertically. By constructing the circuit breaker compartment with the pocket 6 I provide ample space, both horizontally and vertically, for making the necessary connections from the bus bars, and there is provided sufficient room for bus bars of any reasonable dimensions. Also, by reason of the stepped back arrangement of the walls 4 and 5, it is possible to move the busbar compartment forward so that the back wall 36 thereof is flush with the wall 5 of the circuit breaker compartment, to allow ample space for disconnecting switches that may be associated with the busbar compartment. Such an arrangement will be more fully described in connection with the structure shown in Fig. 6. Circuit breakers of different dimensions can be used in a common circuit breaker compartment, with little or no displacement of the busbars from their normal location. The compartments constituting the switchgear, namely the compartments 1, 35 and 42, are secured together, preferably by welding.

The circuit breaker compartment 1, with its rear wall constructed to form a pocket 6, and with the horizontal circuit breaker disconnects, lends itself admirably for use in building up switching units for various types of circuits in common use. A few such units will be described for illustrative purposes.

Reference may now be had more particularly to Fig. 5. In this figure I have shown a circuit breaker compartment 1, of a construction identical with that of the compartment 1 of Fig. 1, and a main busbar compartment 35 of a construction identical with that of the correspondingly numbered compartment of Fig. 1. In addition, there is provided a second or transfer bus compartment, indicated at 50, which is mounted on the compartment 35 with its rear wall 51 flush with the wall 36 of the compartment 35. The transfer bus compartment 50 contains three transfer busses, one for each phase, indicated at 53, 54 and 55. Three disconnect switches 60, in horizontal alignment, are provided in this busbar compartment, one for each phase. The disconnect switches 60 may be of any preferred construction wherein the switch opening and closing action is obtained by a horizontal or plunging movement of a movable contact-making member. The movable contact-making member is permanently connected to an associated one of the busses and is adapted to engage a stationary contact at the rear of the switch. While any type of disconnect switch having the above-mentioned action may be used, I prefer to use a switch of a construction such as is illustrated more fully in Fig. 18, to be presently described, although it is to be understood that the present invention is not limited to the use of a switch of this precise construction. It is sufficient to state, for the present, that the switch is provided with a horizontally movable contact-making member which is actuated by an insulating rod 61 that extends into the open front end of a tubular casing. The insulating rod 61 is shown in its "switch closed" position in Fig. 5. It is movable to its open position by a link 62, mounted on a shaft which is pivoted at 63, and provided with an operating handle 64. Counterclockwise movement of the operating handle 64 about the pivot 63 causes the retraction of the rod 61 and consequent opening of the disconnect switch 60. As previously stated, there are three disconnect switches 60, one for each of the busses, the switches being mounted in horizontal alignment. The other two switches are connected to be operated by movement of the single handle 64.

Each of the disconnect switches is mounted in and extends through the rear wall 51 of the transfer bus compartment 50. At its rear end each of the switches is connected by means of a conductor bar 66 to the stationary contact of the disconnect switch 8, which contact is also connected, through the current transformer 42, to the outgoing line or circuit 40. It is thus apparent that in the system shown in Fig. 5, the respective conductors of the line may be connected to the busbars 53, 54 and 55 through the disconnect switch 60, independently of the circuit breaker, or may be connected to the main busbars 37, 38 and 39, through the circuit breaker. It is also apparent that the main and the transfer busses may be interconnected through the disconnect switches 60 and the circuit breaker, if desired.

The circuit breaker bushings are enclosed in a metal housing 65, from which the contact-making members extend horizontally for movement into the tubular members of the switches 7 and 8.

A standardized sheet metal housing 68 encloses the current transformers 42 and the rear ends of the disconnect switches 8 and 60. When the line 40 extends to the switch gear from an overhead direction instead of from underground, the current transformer 42 is mounted above the disconnect switches 60, and the sheet metal compartment 68 is reversed so that the line receiving end therefor is at the top, instead of at the bottom, as in Fig. 5.

In Fig. 6 I have shown an arrangement wherein there is provided two sets of busbars, as in Fig. 5, but different therefrom in that here both busbar compartments are provided with disconnect switches. In this construction the busbar compartments, with the busbars and disconnect switches therein, are indicated by the same reference numeral 50, as in Fig. 5, since these compartments are of the same construction as the corresponding structures in Fig. 5. In this instance the busbar compartments have been mounted with their rear walls 51 flush with the forwardly stepped portion 5 of the rear wall of the circuit breaker compartment 1. This construction allows for the location of the rearwardly projecting portions of the disconnect switches 60 in the space immediately above the pocket 6 of the circuit breaker compartment. The stationary contacts of the corresponding disconnect switches of the upper and lower sets are connected together and to the stationary contacts of the disconnects 7 of the circuit breaker compartment by means of connecting bars or conductors 70. Here, as in Fig. 1, the outgoing line is indicated at 40, and the current transformer compartment at 41, said compartment being of a construction identical with that of Fig. 1. It is apparent from the circuit connections here shown that the line 40 can be connected through the circuit breaker to either of the two busses at will, by closing one of the sets of disconnecting switches 60 and opening the other. It is also apparent, that, if desired, the two sets of disconnect switches 60 may be used to interconnect the two busses, or the upper and lower bus compartments may house different sections of one bus. The lower set of disconnect switches 60 are operated by an operating handle 64, and the upper set of disconnect switches may be operated by a similar handle in alignment with the handle 64 and connected to the arm 75 by means of a rod 76. A sheet metal housing 77 is provided for enclosing the rearwardly projecting parts of the two sets of disconnect switches 60—60. The rear wall 78 of the compartment 77 is flush with the rear wall 4 of the circuit breaker compartment 1.

The conductors of an incoming circuit or line 40—40 are connected to the stationary contacts of the respective circuit breaker disconnects 8, through individual current transformers 42, as in the switchgear of Fig. 1. The circuit extends through the disconnects 8 and the circuit breaker, thence to the disconnect 7 and to one or the other of the sets of busses in the two bus compartments through the selected one of the disconnect switches 60—60. If desired, the two disconnect switches 60—60 may be closed so that the line is fed from or feeds to both busses. Also, if desired, the circuit breaker may be open and the two disconnect switches 60—60 closed so that one bus supplies current to the other, while the circuit 40 remains dead.

Reference may now be had more particularly to Figs. 7 to 15 inclusive, wherein there is shown, schematically, various combinations of switchgear units whereby various circuit connections may be obtained. In these figures the parts that are the same as parts in Figs. 1 to 6 have been designated by the same reference numerals. In Fig. 7 there is shown a schematic arrangement similar to the arrangement of Fig. 1, wherein the circuit breaker compartment is indicated at 1, the main bus compartment at 35 and the current transformer and incoming line compartment is indicated at 41. The structures of these compartments are the same as is illustrated in Fig. 1, and a description thereof need not be repeated at this time. In addition there is provided a sheet metal potential transformer compartment 85 which contains a step-down potential transformer 86 and a usual resistance 87. The high potential side of the transformer is connected to the outgoing line 40, at the back end of the circuit breaker disconnect switch 8 by means of an insulated metal sheathed cable 88. The low potential side of this transformer is connected to the usual metering and control apparatus.

Figure 8 shows an arrangement similar to Fig. 7, different therefrom in that here the conductor 40 is an overhead conductor rather than an underground conductor. The compartment 41 is mounted in a position reversed with respect to the position in Fig. 7 so that what was the bottom edge in Fig. 7 is the top edge in Fig. 8. It is to be noted that the top edge of the compartment 41, in Fig. 8, is flush with the top edge of the compartment 35.

In Fig. 9 there is shown a system wherein two sets of switchgear, each of a construction substantially like that of Fig. 7, are located back-to-back, and supply current to or receive current from a single circuit 40. In this construction the compartment 41' is somewhat different from that of the corresponding compartment 41 of Fig. 7 in that this compartment houses the rear ends of the disconnects 8 of the left hand circuit breaker compartment as well as the rear ends of the corresponding disconnects of the right hand circuit breaker compartment. It is to be noted that the compartment 41' is of a length substantially the same as that of the compartment 41 so that it too may be reversed, or rotated through an angle of 180° about the center line of the disconnects 8, to receive an overhead line, instead of an underground line.

Fig. 10 illustrates a switching unit such as is shown in Fig. 5, and illustrates in dotted lines, the location of the compartment 68 when the same is reversed to receive an overhead line. The current transformers 42 are then in the upper position instead of in the lower position as in Fig. 5.

In Fig. 11 I have illustrated an arrangement wherein the standardized units are assembled in a circuit for interconnecting a main bus with a transfer bus through a circuit breaker. The main bus compartment is indicated at 35, said compartment being of a construction such as is illustrated in Fig. 1, and the transfer bus compartment is indicated at 50 and is of a construction such as is illustrated in Fig. 5, being provided with horizontally movable disconnect switches 60. The compartment 68' is provided for enclosing the rear ends of the disconnect switches 60 and of the circuit breaker disconnect contacts 8, the current transformers 42 being provided in this compartment in connections between the switches 60 and 8. When the switches 60 are closed, the main and the transfer busses may be tied together through the circuit breaker.

In Fig. 12 I have shown an arrangement of units 1, 35 and 41, of a construction such as shown in Fig. 1, together with a transfer bus compartment 50 of a construction such as shown in Fig. 5. The transfer bus compartment is set forward of the main bus compartment 35 to provide room for a line compartment 90 which is of a height somewhat in excess of the height of the transfer bus compartment 50. The rear wall of the compartment 90 is flush with the rear wall of the compartment 35. A disconnect switch compartment 92 is mounted on the transfer bus compartment 50, and is provided with three horizontally movable regulator disconnect switches 60 in horizontal alignment. The switches 60 are of the same construction as the correspondingly numbered switches in the switch gear illustrated in Fig. 5. Any type of horizontally movable disconnect switch may be used, the preferred type being of the construction illustrated in Fig. 18. The rear ends of the regulator disconnect switches 60 in the uppermost compartment, and the rear ends of corresponding transfer bus disconnect switches are tied together by connections 93, which are also connected to the outgoing line or circuit 94. The conductors from the compartment 41 of this switching unit are connected through a voltage regulator 95 to the movable contacts of the regulator disconnect switches 60 in the compartment 92. The two sets of disconnect switches in the compartment 92 and 50 respectively, are arranged to be individually operated through a linkage 96, which may be of a construction similar to that previously described for the switch gear of Fig. 6. The busses of the switchgear of Fig. 12 may be interconnected by a unit such as is shown in Fig. 11 and located adjacent the unit of Fig. 12, so that the busbars extend from one unit to the other.

Fig. 13 shows an arrangement like that of Fig. 6, and illustrates the location of the line current transformer compartment 41 when the same is mounted to receive an overhead conductor instead of an underground conductor.

Fig. 14 illustrates an arrangement of units wherein the line 40 may be connected to either or both of two busses, selectively, through a circuit breaker or independently of the circuit breaker, at will. There is provided an L-shaped line disconnect compartment 100 having a set of three disconnect switches 101, one for each phase, in horizontal alignment, and each of a construction such as is shown more fully in Fig. 18. Each switch 101 is connected, at its stationary side, to a conductor of the line 40, and at its movable side to the two bus disconnects of the corresponding phases and to the corresponding terminal of the circuit breaker, by a conductor 102. In this arrangement, when the line is fed from either bus through the disconnects 101, the circuit breaker terminals are alive, even though the breaker is in its "switch open" position. The two sets of disconnect switches associated with the respective bus compartments, and the set of disconnect switches 101, may be selectively operated through a linkage 103, each set being provided with an operating lever for simultaneously operating all the disconnects of the set, there being three operating levers in horizontal alignment, so that only one is seen in Fig. 14. The outgoing line and current transformer compartment is indicated at 104 and may be mounted to receive an underground line 40, as illustrated, or may be mounted to receive an overhead line as in Fig. 10. When it is mounted to receive an overhead line its position is substantially reversed from the position illustrated in Fig. 14, so that the part thereof which previously embraced the rear end of the disconnect switch 101, now embraces the rear end of the lower circuit breaker disconnect switch.

In Fig. 15 there is illustrated an arrangement which is similar to Figs. 12 and 14. It is similar to Fig. 12 in that here the line 94 may be energized through a regular 95 in series with the circuit breaker. It is similar to Fig. 14 in that here the line may be energized from either or both of two busses independently of the circuit breaker and the regulator. There is a further difference over that of Fig. 14 in that here one side of the circuit breaker may be dead when the line is fed directly from a bus, a condition which cannot prevail in the circuit of Fig. 14. In this construction the circuit breaker compartment 1 supports two bus compartments 50—50 housing two sets of busses, the busses being provided with disconnect switches as in Fig. 6. The upper bus compartment supports a disconnect switch compartment 110, which houses two sets of disconnects 111 and 112 each of a construction such as is illustrated in Fig. 18, although other horizontal type disconnect switches may be used. The front movable contacts of the disconnect switches 111 and 112 are connected together by conductors 115 which are connected also to the respective conductors of the outgoing line 94. The rear ends of corresponding disconnect switches of the set of switches 111 and of the switches of the bus compartments 50—50 are connected together and to the rear end of the upper circuit breaker disconnect contacts by conductors 116. The outgoing conductors from the compartment 41 are connected through the regulator 95 to the stationary rear contacts of the disconnect switches 112, a sheet metal compartment 117 being provided to enclose the rear contacts of switches 112. It is to be noted that the compartment 41 may be reversed, as is illustrated in Fig. 13, if it is necessary for the conductors from the regulator 95 to be extended to the compartment 41 from an overhead direction rather than from underground.

When the disconnect switches 112 are closed, and the disconnect switches 111 open, the line 94 may be energized through the regulator and the circuit breaker, from either of the two busses, depending upon whether the disconnects in the upper bus compartment are closed or those in the lower bus compartment are closed. When the disconnects 112 are open, and the disconnects 111 closed, the line may be energized, selectively, from either or both of the two busses. Under these conditions, one side of the circuit breaker is open.

The four sets of disconnect switches of Fig. 15 may be operated, selectively, by means of a linkwork such as is illustrated in Figs. 16 and 17, to which reference may now be had. The lower disconnects are connected by means of the insulating rods 61 to links 130 which, in turn, are interconnected by a shaft 131 so that they can be rocked by a downward pull on a handle 133, the links 130 being keyed to the shaft 131. The disconnects of the top bus compartment are actuated in substantially the same manner, through links 135 that are interconnected by a shaft 136 which is rocked by downward pull on a rod 137 through a handle 138 which is mounted on but not keyed to the shaft 131. In a like manner, the disconnects 111 are operated by their pull rods 140 through links 141 that are tied together by a rod or shaft 142 and actuated by a pull rod 143 through a handle 144 which is mounted on but not keyed to the shaft 131. The three disconnects 112 are operated in the same manner through a tie shaft 145, a rod 146 and a handle 147 that is mounted on but not keyed to the shaft 131. Thus, by actuating any one of the four handles 133, 138, 144 or 147, the corresponding set of the four sets of disconnect switches may be actuated. When there are only three sets of disconnect switches, as there is in Fig. 14, one of the sets of actuating links of Figs. 16 and 17 is omitted.

Reference may now be had to Figs. 18 to 24 inclusive, showing the construction of one of the horizontally movable disconnect switches. The switch is indicated in general by reference numeral 60 and is adapted to extend through and be mounted on the rear wall of a bus compartment such as the rear wall 51 of the compartment 50 of Fig. 5. A fragmentary portion of the supporting rear wall 51 is indicated in Fig. 18. The switch comprises a tubular body, in one end of which is mounted a stationary contact and in the other end of which is mounted a carriage that supports a movable contact which moves horizontally within the tube into and out of engagement with the stationary contact. The outer supporting casing is cylindrical and is made of suitable insulating material, preferably laminated for a purpose to be more fully set forth as this description proceeds. The supporting casing comprises an inner tube of insulation 202, in the forward end of which is secured a conducting bar 203 by means of suitable screws or the like 204 that terminates flush with the outer periphery of the tube 202. An intermediate tube of insulation 205 fits snugly over the tube 202 and covers the ends of the screws 204 that hold the conducting bar 203 in position. A terminal 207 is bolted to the forward end of the conducting bar 203 and is adapted to have a circuit conductor bolted or otherwise secured thereto. A movable member of copper or other high conducting material, in the form of a tube 210, longitudinally slit at the top, is supported within the insulating tube 202 on two pairs of rollers 211 and 212 so that the movable member 210 can ride forward and backward within the tube 202. The forward end of the movable member carries a copper ring 214 within which are mounted a series of spring contacting fingers 215 which are clamped in place by a ring 216. The fingers 215 constitute the female contact of the switch, the foward ends of the fingers 215 being pressed inwardly by coil springs 218 and 219 so that the female contact firmly grips the male contact. A plate 220 closes the forward end of the movable member 210.

A movable carriage is mounted within the movable member 210. The carriage comprises a pair of pulleys 222 and 223 secured together on their opposite sides by tie bars 224 which maintain the pulleys a fixed distance apart, but permit free rotary motion of the pulleys. A laminated endless copper belt 225 is wound around the pulleys 222 and 223. The belt is welded to the member 210 at 228, and is welded to the bar 203 at 229. These points 228 and 229 are spaced apart a distance exactly equal to half the entire length of the belt 225, so that when current flows through the belt from point 229 to point 228 it flows over two paths in parallel and of equal resistance and inductance. The carriage, including the pulleys 222 and 223 and the tie bars 224, may be advanced or retracted by pushing or pulling on the insulating rod 61 that is connected to the forward end of the tie bars 224. Belt and pulley guides 226—226 are secured to the tube for guiding the carriage. As the carriage moves forward, the point 229 remains stationary, being welded to the bar 203, and therefore the pulleys 222 and 223 roll in a counter-clockwise direction within the belt. The belt thus moves the tube 210 forward, since the point 228 on the belt is welded to the tube 210. The speed of travel of the tube 210 will be just twice the speed of travel of the carriage within the tube. The female contact carried at one end of the tube 210 is thus moved rearwardly within the tube 202 until it engages a stationary contact 235 mounted at the rear end of the tube 202. An electric connection is thus established between the terminal 207 and the contact 235, said connection extending from terminal 207, through the conducting bar 203, to the point 229 where the laminated belt 225 is welded to the bar 203, thence in opposite directions along the belt 225 to the point 228 where the belt is welded to the tube 210, thence by way of the tube, to the female contact 215, which is in engagement with the male contact 235. It is to be noted that the flexible connection between the female contact 215 and the stationary bar 203 is taut at all times, and that there is no sliding connection between the female contact and the terminal 207. In this disconnecting switch the only sliding contact is the one between the male and female contacts. The purposes of the pulleys 222 and 223 is mainly to hold the belt 225 in its normal shape at all times, to fix the minimum diameter around which the belt can be bent, and to assist in keeping the movable contact member in a straight line path of travel. At the rear end of the bar 203 there is provided a similarly shaped bar 237 of insulation, in alignment with the bar 203 to guide the belt as the carriage is moved towards its "switch closed" position. Insulating tubes 239 and 240 are secured over the forward and rear ends of the outer tube 205 on opposite sides of the wall 51 of the compartment. The ends of the tubes 202, 205 and 240 opposite the contact 235 are cut away, as indicated at 241 to permit inspection of the contacts when they are in engagement. A sliding tube of insulation 242 is provided at the rear end of the switch, which tube may be slipped to the right from the position shown in Fig. 18 so that it covers the opening 241. When this is done, the entire disconnect switch is a closed unit fully insulated and adequately protected. The only exposed live parts are the terminal 207 for receiving one line connection, and a stud 244 for receiving another line connection. If any one of the laminations of the belt 225 should break, there is no possible danger that it will extend beyond the female contact in a direction towards the male contact, since the rear end of the carriage is entirely closed. By reason of the two insulating tubes 202 and 205, instead of a single tube of their combined thickness, the heads of the screws 204 are covered by the insulating tube 205, so that the creepage distance from the screws to the grounding frame 51, which surrounds the tube 205, is very greatly increased.

In compliance with the requirements of the patent statutes I have here shown and described a preferred embodiment of my invention. It is, however, to be understood that the invention is not limited to the apparatus here shown, the same being merely illustrative of the principles of the invention. What I consider new and desire to secure by Letters Patent is:

1. Electric switching apparatus comprising a sheet metal circuit breaker compartment, the rear wall on the interior of the compartment being stepped forward adjacent the top of the compartment to form a pocket at the upper rear outer edge of the compartment, a horizontally disposed tubular contact housing extending through said forwardly stepped rear wall and opening on the inside of the compartment for receiving a horizontally movable contact-making member, a contact in said housing, a busbar compartment above said pocket, a conductor extending from the busbar compartment into said pocket and a connection between the conductor and said contact, the connection being in said pocket.

2. Electric switching apparatus comprising a sheet metal circuit breaker compartment, the rear wall on the interior of the compartment being stepped forward adjacent the top of the compartment to form a pocket at the upper rear outer edge of the compartment, a horizontally disposed tubular contact housing mounted in said forwardly stepped rear wall and opening on the inside of the compartment for receiving a horizontally movable contact-making member, a contact in said housing, connections to said contact, the connections being in said pocket, a second tubular contact housing mounted in and extending through the backmost part of the rear wall of the compartment and also opening into the compartment, and a switch contact in said second tubular housing.

3. Electric switching apparatus comprising a sheet metal circuit breaker compartment, the rear wall on the interior of the compartment being stepped forward adjacent the top of the compartment to form a pocket at the upper rear outer edge of the compartment, a horizontal disposed tubular contact housing mounted in said forwardly stepped rear wall and opening on the inside of the compartment for receiving a horizontally movable contact-making member, a contact in said housing, connections to said contact, the connections being in said pocket, a second tubular contact housing mounted in and extending through the backmost part of the rear wall of the compartment and also opening into the compartment, a switch contact in said second tubular housing, a circuit breaker in said compartment and movable horizontally forward and backward in the compartment, and bushings on said circuit breaker terminating in horizontally disposed contact-making members, said contact-making members being moved into and out of engagement with the corresponding contacts in the tubular housings by horizontal movement of the circuit breaker in the compartment.

4. Electric switching apparatus comprising a circuit breaker compartment having a rear wall, the rear wall being stepped forward adjacent the top of the compartment, and horizontally extending disconnect switch contacts supported by the rear wall at different horizontal levels, the lower disconnect contact being adjacent the backward portion of the rear wall and the top disconnect contact being spaced from the forwardly stepped part of the rear wall and terminating at its rearmost part forward of the back portion of the rear wall.

5. Electric switching apparatus comprising a circuit breaker compartment having a rear wall, the rear wall being stepped forward adjacent the top of the compartment, horizontally extending disconnect switch contacts supported by the rear wall at different horizontal levels, the lower disconnect contact being at the backward portion of the rear wall and the top disconnect contact being located in the forwardly stepped part of the rear wall and terminating at its rearmost part forward of the back portion of the rear wall, and a circuit breaker movable horizontally in said compartment and having disconnect switch contacts movable into and out of engagement with both of said compartment disconnect contacts by horizontal movement of the breaker.

6. In an electric current distributing system, means forming a circuit breaker compartment, a plurality of horizontally extending stationary disconnecting switch contact members mounted in two parallel rows, one above the other, with the upper row set forward of the lower row, bus connections connected to the respective contact members of the top row below the top of the compartment, another set of connections to the contact members of the lower row, a vertically extending grounded plate between the two sets of connections, both sets of contacts being accessible from within the compartment for establishing switching connections thereto, and switching means in said compartment for connecting corresponding contacts of the two rows, said switching means including means extending through said plate into circuit closing relation to one of said sets of contacts.

7. In an electric current distributing system, a plurality of horizontally extending stationary disconnecting switch contact members mounted in two parallel rows, one above the other, with the upper row set forward of the lower row, bus connections connected to the respective contact members of the top row below the top of the compartment, another set of connections to the contact members of the lower row, vertically extending grounded means between the two sets of connections, switching means for connecting corresponding contacts of the two rows, and additional means, including a circuit breaker, adapted to interconnect corresponding disconnect switch contact members of the two rows, said breaker being horizontally movable into and out of its operative position and said additional interconnecting means including switching means movable through said grounded means.

8. In an electric current distributing system, a plurality of horizontally extending stationary disconnecting switch contact members mounted in two parallel rows, one above the other, with the upper row set forward of the lower row, bus connections connected to the respective contact members of the top row, another set of connections to the contact members of the lower row, vertically extending grounded means between the two sets of connections, switching means for connecting corresponding contacts of the two rows, additional means, including a circuit breaker, adapted to interconnect corresponding disconnect switch contact members of the two rows, said breaker being horizontally movable into and out of its operative position, and said additional interconnecting means including switching means movable through said grounded means.

9. Electric switching apparatus comprising a polyphase circuit breaker having two rows of bushings terminating in two vertically spaced rows of horizontally extending disconnect contact-making members, the contact-making members in the lower row extending rearwardly of those in the upper row, means forming a circuit breaker compartment, the circuit breaker being movable horizontally forward and backward in said compartment, the rear wall of the compartment having vertically spaced rows of contact members engaged by the contact-making members on the bushings of the circuit breaker upon horizontal movement of the breaker to its normal position in the compartment.

10. Electric switching apparatus comprising a polyphase circuit breaker having bushings terminating in horizontally extending disconnect contact-making members at two different levels, the contact-making members at the lower level extending rearward of the members at the higher level, means forming a circuit breaker compartment, the circuit breaker being movable horizontally forward and backward in said compartment, sets of stationary contact members mounted at different levels with the lower set rearwardly of a rear wall of the compartment and both sets engaged by the contact making members on the bushings of the circuit breaker upon horizontal movement of the breaker to its normal position in the compartment and a horizontally extending barrier between said sets of contact members.

11. Electric switching apparatus comprising a sheet metal circuit breaker compartment, the rear wall on the interior of the compartment being stepped forward adjacent the top of the compartment to form a pocket on the outside of the compartment at the upper rear edge thereof, a circuit breaker disconnect contact carried by the forwardly stepped part of the rear wall of the compartment and adapted to have switching connections established therewith from the interior of the compartment, and a second circuit breaker disconnect contact carried by the rear wall of the compartment below the stepped forward portion and also adapted to have switching connections established thereto from the inside of the compartment.

12. Electric switching apparatus comprising a sheet metal circuit breaker compartment, the rear wall on the interior of the compartment being stepped forward adjacent the top of the compartment to form a pocket on the outside of the compartment at the upper rear edge thereof, a circuit breaker disconnect contact carried by the forwardly stepped part of the rear wall of the compartment and adapted to have switching connections established therewith from the interior of the compartment, conductors establishing connections to the disconnect contact, said conductor connections being in said pocket and forward of the rearmost wall of the compartment, and a second circuit breaker disconnect contact carried by the rear wall of the compartment below the stepped forward portion and also adapted to have switching connections established thereto from the inside of the compartment.

13. Electric switching apparatus comprising a sheet metal circuit breaker compartment, the interior of the compartment having a stepped forward rear wall adjacent the top of the compartment to form a pocket on the outside of the compartment at the upper rear edge thereof, a circuit breaker disconnect contact carried by the forwardly stepped rear wall of the compartment and adapted to have switching connections established therewith from the interior of the compartment, conductors establishing connections to the disconnect contact, said conductor connections being in said pocket and forward of the rearmost wall of the compartment, a second sheet metal compartment supported by the circuit breaker compartment and enclosing said conductor connections, said second compartment having a vertical rear wall substantially flush with the rearmost wall of the circuit breaker compartment subjacent to the pocket, and a second circuit breaker disconnect contact carried by the rear wall of the circuit breaker compartment below the stepped forward wall portion, and also adapted to have switching connections established thereto from the inside of the circuit breaker compartment.

14. Electric switching apparatus comprising a sheet metal circuit breaker compartment, the rear wall on the interior of the compartment being stepped forward adjacent the top of the compartment to form a pocket on the outside of the compartment at the upper rear edge thereof, a circuit breaker disconnect contact carried by the forwardly stepped part of the rear wall of the compartment and adapted to have switching connections established therewith from the interior of the compartment, conductors establishing connections to the disconnect contact, said conductor connections being in said pocket and forward of the rearmost wall of the compartment, a second circuit breaker disconnect contact carried by the rear wall of the compartment below the stepped forward portion and also adapted to have switching connections established thereto from the inside of the compartment, conductors establishing connections with said second disconnect contact at the rear exterior of the circuit breaker compartment, and a circuit breaker in the circuit breaker compartment, said circuit breaker having disconnect switch contacts movable into and out of engagement with the two disconnect contacts carried by the circuit breaker compartment.

15. Electric switching apparatus comprising a sheet metal circuit breaker compartment, a horizontally extending circuit breaker disconnect contact within the compartment and adapted to have switching connections established therewith from the interior of the compartment, conductors establishing connections to the disconnect contact, and a sheet metal bus compartment supported by the circuit breaker compartment and enclosing said conductor connections, said bus compartment having a vertical rear wall substantially flush with the rear wall of the circuit breaker compartment.

16. Electric switching apparatus comprising a sheet metal circuit breaker compartment, a horizontally extending circuit breaker disconnect contact within the compartment and adapted to have switching connections established therewith from the interior of the compartment, conductors establishing connections to the disconnect contact, a sheet metal bus compartment supported by the circuit breaker compartment and enclosing said conductor connections, said bus compartment having a vertical rear wall substantially flush with the rear wall of the circuit breaker compartment, a second horizontally extending circuit breaker disconnect contact carried by the rear wall of the circuit breaker compartment below and rearwardly of the first-mentioned contact and also adapted to have switching connections established thereto from the inside of the circuit breaker compartment, conductors establishing connections with said second disconnect contact at the rear exterior of the circuit breaker compartment, and a circuit breaker in the circuit breaker compartment, said circuit breaker having two sets of disconnect switch contacts movable into and out of engagement with the respective disconnect contacts in the circuit breaker compartment.

17. Electric switching apparatus comprising a sheet metal circuit breaker compartment, a horizontally extending circuit breaker disconnect contact within the compartment and adapted to have switching connections established therewith from the interior of the compartment, conductors establishing connections to the disconnect contact, a sheet metal bus compartment supported by the circuit breaker compartment and enclosing said conductor connections, said bus compartment having a vertical rear wall substantially flush with the rear wall of the circuit breaker compartment, a second horizontally extending circuit breaker disconnect contact carried by the rear wall of the circuit breaker compartment below and rearwardly of the first mentioned contact and also adapted to have switching connections established thereto from the inside of the circuit breaker compartment, conductors establishing connections with said second disconnect contact at the rear exterior of the circuit breaker compartment, and a horizontally movable circuit breaker in the circuit breaker compartment, said circuit breaker having two sets of disconnect switch contacts movable into and out of engagement with the respective disconnect contacts in the circuit breaker compartment by horizontal movement of the circuit breaker.

18. Electric switching apparatus comprising a circuit breaker compartment, means forming a pocket in the compartment along the outside upper rear edge thereof, a horizontally extending circuit breaker disconnect within the compartment with the rear end of the contact in said pocket, said contact being adapted to have switching connections established therewith from the interior of the compartment, a busbar compartment above the pocket, a bus in said last mentioned compartment, conductors establishing connections from the bus to the disconnect contact, the conductor connections with said contact being in said pocket and forward of the rearmost wall of the compartment.

19. Electric switching apparatus comprising a circuit breaker compartment, means forming a pocket in the compartment along the outside upper rear edge thereof, a circuit breaker assembly in said compartment and extending rearwardly of said pocket, a horizontally extending circuit breaker disconnect within the compartment with the rear end of the contact in said pocket, said contact being adapted to have switching connections established therewith from the interior of the compartment, conductors establishing connections to the disconnect contact, the conductor connections with said contact being in said pocket and forward of the rear most wall of the compartment, and a metal compartment above and extending forwardly of the pocket of the circuit breaker compartment and enclosing said conductor connections, said second compartment having a vertical rear wall substantially flush with the rear wall of the circuit breaker compartment.

20. Electric switching apparatus comprising a sheet metal circuit breaker compartment, means forming a pocket in the compartment along the outside upper rear edge thereof, a horizontally extending circuit breaker disconnect within the compartment with the rear end of the contact in said pocket, said contact being adapted to have switching connections established therewith from the interior of the compartment, conductors establishing connections to the disconnect contact, the conductor connections with said contact being in said pocket and forward of the rearmost wall of the compartment, a second circuit breaker disconnect contact carried by the rear wall of the circuit breaker compartment below the pocket and also adapted to have switching connections established thereto from the inside of the circuit breaker compartment, conductors establishing connections with said second disconnect contact at the rear exterior of the circuit breaker compartment, and a circuit breaker in the circuit breaker compartment, said circuit breaker having disconnect switch contacts movable into and out of engagement with the respective disconnect contacts carried by the circuit breaker compartment.

21. Electric switching apparatus comprising a sheet metal circuit breaker compartment, means forming a pocket in the compartment along the outside upper rear edge thereof, a horizontally extending circuit breaker disconnect within the compartment with the rear end of the contact in said pocket, said contact being adapted to have switching connections established therewith from the interior of the compartment, conductors establishing connections to the disconnect contact, the conductor connections with said contact being in said pocket and forward of the rearmost wall of the compartment, a second sheet metal compartment supported by the circuit breaker compartment and enclosing said conductor connections, said second compartment having a vertical rear wall substantially flush with the rear wall of the circuit breaker compartment, a second circuit breaker disconnect contact carried by the rear wall of the circuit breaker compartment below the pocket and also adapted to have switching connections established thereto from the inside of the circuit breaker compartment, conductors establishing connections with said second disconnect contact at the rear exterior of the circuit breaker compartment, and a circuit breaker in the circuit breaker compartment, said circuit breaker being horizontally movable in said compartment and having disconnect switch contacts movable into and out of engagement with the respective disconnect contacts carried by the circuit breaker compartment by horizontal movement of the breaker.

22. Electric switching apparatus comprising a sheet metal circuit breaker compartment, means forming a pocket in the compartment along the outside upper rear edge thereof, a horizontally extending circuit breaker disconnect within the compartment with the rear end of the contact in said pocket, siad contact being adapted to have switching connections established therewith from the interior of the compartment, conductors establishing connections to the disconnect contact, the conductor connections with said contact being in said pocket and forward of the rearmost wall of the compartment, a second sheet metal compartment supported by the circuit breaker compartment and enclosing said conductor connections, said second compartment having a vertical rear wall substantially flush with the rear wall of the circuit breaker compartment, a second circuit breaker disconnect contact carried by the rear wall of the circuit breaker compartment below the pocket and also adapted to have switching connections established thereto from the inside of the circuit breaker compartment, conductors establishing connections with said second disconnect contact at the rear exterior of the circuit breaker compartment, and a circuit breaker in the circuit breaker compartment, said circuit breaker having disconnect switch contacts movable into and out of engagement with the respective disconnect contacts carried by the circuit breaker compartment.

23. Polyphase electric switching apparatus comprising means forming an enclosed circuit breaker compartment having a rear wall, means forming a pocket at the top of the compartment and forward of the rear wall thereof a set of horizontally extending circuit breaker disconnect contacts, one for each phase, within the pocket and forward of said rear wall and adapted to have switching connections established therewith from the interior of the compartment, conductors establishing connections to the disconnect contacts, and a sheet metal bus compartment above and supported by the circuit breaker compartment and enclosing said conductor connections, said bus compartment having a vertical rear wall substantially flush and mechanically continuous with the rear wall of the circuit breaker compartment.

24. Polyphase electric switching apparatus comprising means forming an enclosed circuit breaker compartment having a rear wall, a set of horizontally extending circuit breaker disconnect contacts, one for each phase, within the compartment and adapted to have switching connections established therewith from the interior of the compartment, conductors establishing connections to the disconnect contacts, a second set of horizontally extending circuit breaker disconnect contacts, one for each phase, carried by the rear wall of the circuit breaker compartment below the first set of contacts and also adapted to have switching connections established thereto from the inside of the circuit breaker compartment, conductors establishing connections with said second set of disconnect contacts at the rear exterior of the circuit breaker compartment, a circuit breaker in the circuit breaker compartment, said circuit breaker having disconnect switch contacts being movable into and out of engagement with the respective disconnect contacts carried by the circuit breaker compartment, and a sheet metal bus compartment supported by the circuit breaker compartment and enclosing said first-mentioned conductor connections, said bus compartment having a vertical rear wall substantially flush and mechanically continuous with the rear wall of the circuit breaker compartment.

25. Polyphase electric switching apparatus comprising means forming an enclosed circuit breaker compartment, a set of horizontally extending circuit breaker disconnect contacts, one for each phase, within the compartment and adapted to have switching connections established therewith from the interior of the compartment, a second set of horizontally extending circuit breaker disconnect contacts, one for each phase, below the first set of contacts and also adapted to have switching connections established therewith from the inside of the circuit breaker compartment, a horizontally movable circuit breaker in the circuit breaker compartment, said circuit breaker having disconnect switch contacts movable into engagement with the respective first mentioned disconnect contacts by movement of the circuit breaker, and a bus compartment mounted on the circuit breaker compartment and having horizontally movable plunger type disconnect switches connected in circuit with the circuit breaker.

26. A bus compartment having a rear wall, a bus in the compartment, a disconnect switch comprising a casing mounted in and extending horizontally through the rear wall, a switch operating rod extending through the front of the compartment, a stationary contact within the casing, a horizontally movable contact-making member within the casing and movable by the rod into and out of engagement with the contact, and connections between the switch and the bus.

27. A bus compartment having a rear wall, a polyphase bus in the compartment, a plurality of disconnect switches, one for each bus, the switches being mounted in the rear wall and each including a casing extending horizontally through the rear wall, a contact in each casing, and a contact-making member in each casing movable horizontally within the casing into and out of engagement with the contact.

28. A polyphase switch gear comprising a plurality of rectangular compartments, one above the other, each compartment having a rear wall, a set of disconnect switches mounted in the rear wall of each compartment, each set including one switch for each phase with the switches of each set in horizontal alignment, each switch including a tubular member extending through the rear wall and carrying a stationary contact, a movable contact within each tube and movable into engagement with the stationary contact, a horizontally movable actuating rod for each set, means connecting the rods of each set for joint movement, and horizontally aligned operating handles, one for each set of switches.

29. Electric switching apparatus comprising a circuit breaker compartment, the rear wall on the interior of the compartment being stepped forward adjacent the top of the compartment to form a pocket at the upper rear edge thereof, a circuit breaker disconnect contact in the pocket and adapted to have switching connections established therewith from the interior of the compartment, and a second circuit breaker disconnect contact rearwardly of the rear wall of the compartment below the stepped forward portion and also adapted to have switching connections established thereto from the inside of the compartment, and a circuit breaker structure movable horizontally in said compartment and having switching contacts engaging said previously mentioned disconnecting contacts.

30. Electric switching apparatus comprising a circuit breaker compartment, the rear wall of the compartment being stepped forward adjacent the top of the compartment to form a pocket at the upper rear edge of the compartment, a switching contact in said pocket, said forwardly stepped part having an opening opposite said contact, a circuit breaker movable horizontally in said compartment, said circuit breaker having bushings extending upwardly therefrom, at least one of the bushings being in a position with a part thereof rearward of the front of the forwardly stepped wall of the compartment when the breaker is fully inserted in the compartment, and contact making means movable with the circuit breaker and passable through the opening into engagement with said switching contact, said contact making means being connected in series with the circuit breaker.

31. Electric switching apparatus comprising a circuit breaker compartment, the rear wall on the interior of the compartment being stepped forward adjacent the top of the compartment to form a pocket on the outside of the compartment at the upper rear edge thereof, a circuit breaker disconnect contact in the pocket and adapted to have switching connections established therewith from the interior of the compartment, and a second circuit breaker disconnect contact rearwardly of the rear wall of the compartment below the stepped forward portion and also adapted to have switching connections established thereto from the inside of the compartment.

32. Electric switching apparatus comprising a circuit breaker compartment, sets of horizontally extending disconnect switch contacts at different levels, at least one set being rearwardly of the rearmost wall of the compartment, the contacts at one level being forward of those at the other level, a circuit breaker structure movable horizontally in said compartment, said structure having sets of disconnect switch contacts adapted to engage said first mentioned sets of contacts by a horizontal movement of the circuit breaker structure, at least one set of circuit breaker switch contacts being movable through a rear wall of the compartment into engagement with the corresponding contacts of the first mentioned sets of contacts.

33. Electric switching apparatus comprising a circuit breaker compartment, sets of horizontally extending disconnect switch contacts at different levels, at least one set being rearwardly of the rearmost wall of the compartment, the contacts at the upper level being forward of those at the lower level, a circuit breaker structure movable horizontally in said compartment, said structure having sets of disconnect switch contacts adapted to engage said first mentioned sets of contacts by a horizontal movement of the circuit breaker structure, at least one set of circuit breaker switch contacts being movable through a rear wall of the compartment into engagement with the corresponding contacts of the first mentioned sets of contacts, and insulating housing means associated with one of each pair of cooperating contacts and surrounding each pair of cooperating engaged contacts.

34. Electric switching apparatus comprising means forming a circuit breaker compartment, a horizontal barrier extending below the topmost part of the compartment, a disconnect switch contact located above said barrier and below the topmost part of the compartment, a circuit breaker having a rear bushing and a front bushing, said breaker being movable horizontally in the compartment to an operative position with its rearmost bushing below and rearwardly of the front of said barrier, and connections from one of the vertically extending bushings and terminating in a disconnect switch contact above the barrier and movable into and out of engagement with the first mentioned disconnect switch contact.

35. Electric switching apparatus comprising means forming a circuit breaker compartment, a horizontal barrier extending below the topmost part of the compartment, a disconnect switch contact located above said barrier and below the topmost part of the compartment, a circuit breaker having a rear bushing and a front bushing, said breaker being movable horizontally in the compartment to an operative position with its rearmost bushing below and rearwardly of the front of said barrier, and connections from one of the vertically extending bushings and terminating in a disconnect switch contact above the barrier and movable into and out of engagement with the first mentioned disconnect switch contact by horizontal movement of the circuit breaker within the compartment.

36. Electric switching apparatus comprising means forming a circuit breaker compartment, a horizontal barrier extending below the topmost part of the compartment, a disconnect switch contact located above said barrier and below the topmost part of the compartment, a circuit breaker having a rear bushing and a front bushing, said breaker being movable horizontally in the compartment to an operative position with its rearmost bushing below and rearwardly of the front of said barrier, and connections from one of the vertically extending bushings and terminating in a disconnect switch contact above the barrier and movable into and out of engagement with the first mentioned disconnect switch contact, and horizontally extending insulating tubing surrounding the engaged contacts, one of the cooperating contacts being supported within the tubing and the other contact and the tubing being relatively movable.

ALLEN M. ROSSMAN.